US006900809B2

(12) United States Patent
Qi (10) Patent No.: US 6,900,809 B2
(45) Date of Patent: May 31, 2005

(54) METHOD AND APPARATUS FOR ANIMATION OF AN OBJECT ON A DISPLAY

(75) Inventor: Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 09/982,266

(22) Filed: Oct. 18, 2001

(65) Prior Publication Data

US 2003/0076327 A1 Apr. 24, 2003

(51) Int. Cl.[7] .............................................. G06T 15/00
(52) U.S. Cl. ..................................................... 345/473
(58) Field of Search ................................ 345/473, 474, 345/475, 418, 419, 421

(56) References Cited

U.S. PATENT DOCUMENTS

| | | | | |
|---|---|---|---|---|
| 5,742,291 A | | 4/1998 | Palm ........................... | 345/420 |
| 5,999,194 A | | 12/1999 | Brunelle ...................... | 345/473 |
| 6,072,496 A | * | 6/2000 | Guenter et al. ............. | 345/419 |
| 6,097,381 A | | 8/2000 | Scott et al. .................. | 345/302 |
| 6,208,360 B1 | | 3/2001 | Doi et al. .................... | 345/474 |
| 6,232,965 B1 | | 5/2001 | Scott et al. .................. | 345/302 |
| 6,300,960 B1 | * | 10/2001 | DeRose et al. ............. | 345/474 |
| 6,573,890 B1 | * | 6/2003 | Lengyel ....................... | 345/419 |

\* cited by examiner

*Primary Examiner*—Phu K. Nguyen
(74) *Attorney, Agent, or Firm*—Philip Wadsworth; Sandra L. Godsey; Sayed Hossain Beladi (57) ABSTRACT

A method and apparatus for animation of an object. The invention includes communication destination matrixes used for project source and destination vertex arrays of, source and destination objects from an original space to an ortho-normal space. At a receiver (200), a control system (210) transforms zero-mean of source and destination vertex arrays using, respectively, the source and destination projection matrixes. Control system (210) computes an interim vertex array in the ortho-normal space based on a linear interpolation of the transformed source and destination vertex arrays, and an interim projection matrix based on a linear interpolation of the source and destination projection matrixes. Control system (210) transforms the interim vertex array from the ortho-normal space to the original space based on the interim projection matrix. A display (250) displays an interim object based on the interim vertex array in an animation of the object.

22 Claims, 5 Drawing Sheets

METHOD AND APPARATUS FOR ANIMATION OF AN OBJECT ON A DISPLAY

FIELD

The present invention relates to a field of character animation on a display, and more particularly to providing character animation on a display via wireless communications.

BACKGROUND

A display is connected to most types of electronic devices. Such electronic devices include at least a processor for processing information and signals for projection of an image on an associated display. The image may include alphabetic, numeric, cartoon characters, etc. A character may have a number of objects that may be drawn by lines and curves. The processor by processing information related to the image may provide an animation of a character in the image. For example, the character may be the outline of a person. The animation on the display may show the person playing basketball. The outline of the person as represented by the character may change in a realistically simulated fashion to show various outlines of a person in successive frames showing the person jumping to a basketball hoop. A process commonly known as morphing may be used for producing the animation on the display, however, the animation may not provide a sufficiently accurate and realistic animation of the character at every frame during the animation.

Morphing is a process used for determining the images between an initial image and a destination image. The interim images are determined based on the initial and destination images. Each of the interim images differ from the previous image by only a small amount, and each image incrementally is closer to the destination image. During the animation, a viewer observes the transformation from one image to another by continuously varying images that change gradually from the initial image to the destination image.

Generally, objects such as lines and curves connecting a series of control points form the animated characters in the image. The morphing process creates the changes associated with the objects such as lines and curves for the interim images. The changes are applied to the objects beginning from the initial image and successively to lead to the objects in the final image. However, the process used for creating the changes in the objects such as lines and curves of the characters results in distortion in such a way that the animation of the character appears unreal and inaccurate. For example, a round ball may not appear as round in each interim image. When the animation is displayed, the distortion may cause the ball to appear in a different shape. A common solution may be to provide bit maps of all the images for the animation. However, processing a large set of bit maps for many images may not be practical, especially on the display of a wireless device used in a communication system. Providing animation on the wireless device display may suffer additional difficulty because of the limited resources available for wireless communication of the animation information.

Therefore, there is a need for an improved method and apparatus for morphing, and more particularly for morphing in a wireless communication system to produce character animation on a display.

SUMMARY

A method and apparatus for animation of an object includes determining and transmitting from a transmitter source and destination matrixes for projecting, respectively, source and destination vertex arrays of, respectively, source and destination objects from an original space to an ortho-normal space. At a receiver, a control system transforms zero-mean of source and destination vertex arrays using, respectively, the source and destination projection matrixes. A control system computes an interim vertex array in the ortho-normal space based on a linear interpolation of the transformed source and destination vertex arrays, and an interim projection matrix based on a linear interpolation of the source and destination projection matrixes. The control system transforms the interim vertex array from the ortho-normal space to the original space based on the interim projection matrix. A display displays an interim object based on the interim vertex array in an animation of the object.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Various embodiments of the invention may be incorporated in any electronic device. The electronic device may have an associated display. Furthermore, various embodiments of the invention may be incorporated in a wireless communication system. The wireless communication system may be operating in accordance with a standard based on time division multiple access (TDMA), or code division multiple access (CDMA) technique or any other known techniques. A system in accordance with the TDMA technique has been disclosed in Global System Mobile (GSM) standard, incorporated by reference herein. Moreover, various systems operating in accordance with CDMA technique have been disclosed and described in various standards published by the Telecommunication Industry Association (TIA), Third Generation Partnership Project (3GPP) and Third Generation Partnership Project 2 (3GPP2). Such standards include the TIA/EIA-95 standard, TIA/EIA-IS-856 standard, IMT-2000 standards (including cdma2000 standards and WCDMA standards), all incorporated by reference herein. A copy of the standards may be obtained by writing to TIA, Standards and Technology Department, 2500 Wilson Boulevard, Arlington, Va. 22201, United States of America. The standard generally identified as WCDMA standard, incorporated by reference herein, may be obtained by contacting 3GPP Support Office, 650 Route des Lucioles-Sophia Antipolis, Valbonne-France.

Generally stated, a novel and improved method and apparatus provide for an efficient morphing process for character animation on a display. One or more exemplary embodiments described herein are set forth in the context of an electronic device with an associated display, such as a mobile phone in a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
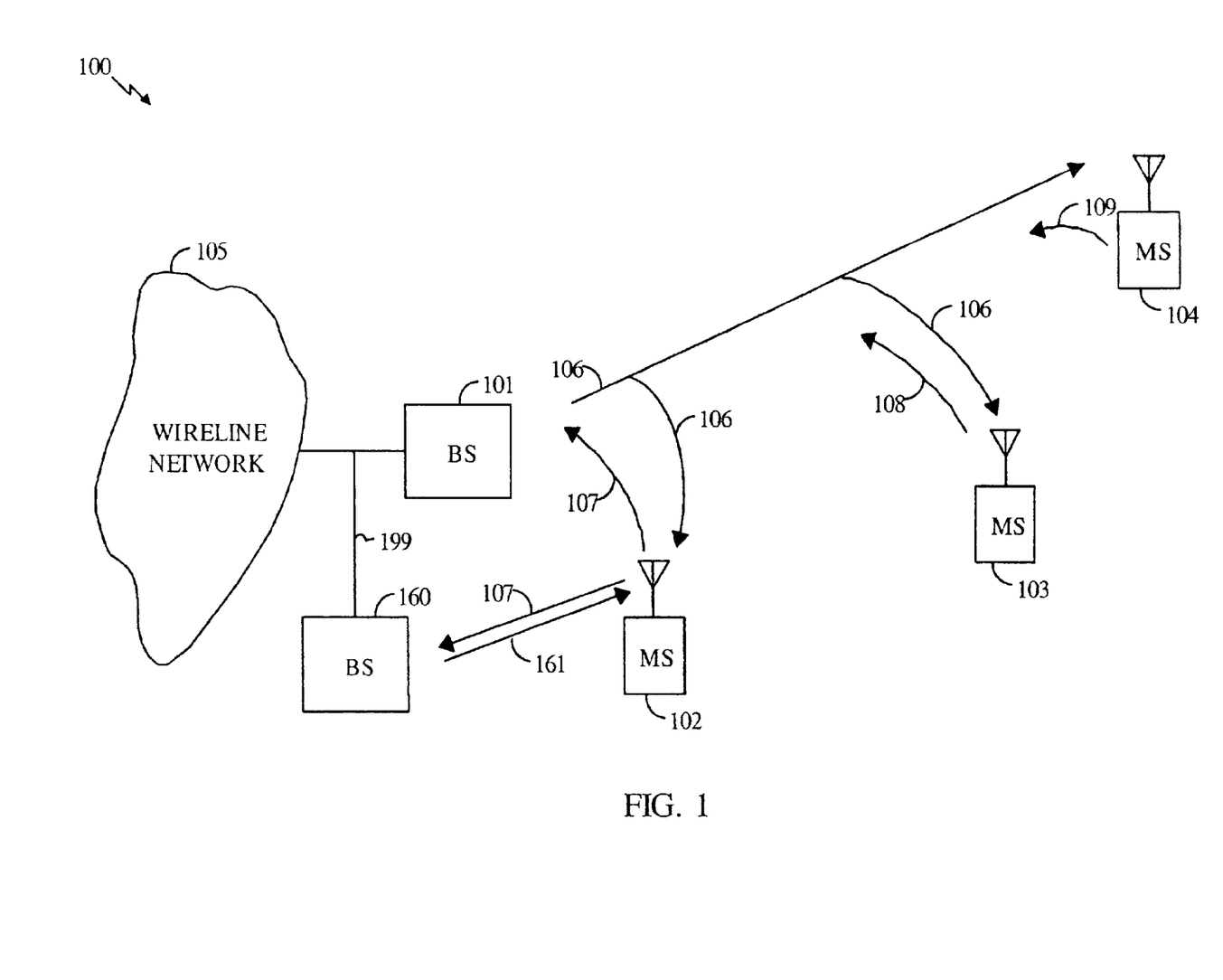
FIG. 1 illustrates a communication system capable of incorporating various embodiments of the invention.

FIG. 1 illustrates a general block diagram of a communication system 100 capable of operating in accordance with any of the standards, including code division multiple access (CDMA) communication system standards, while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. Each of the mobile stations 102–104 may have an associated display. The mobile stations in FIG. 1 may be referred to as data access terminals and the base station as data access network without departing from the main scope and various advantages of the invention. Base station 101 may include a number of components, such as a base station controller and a base transceiver system. For simplicity, such components are not shown. Base station 101 may also be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signal may carry character animation information in accordance with various aspects of the invention. The character animation information may be used by a receiving mobile station to display animation of a character on an associated display in accordance with various aspects of the invention. The forward link signals targeted for mobile stations 102–104 may be summed to form a forward link signal 106. Each of the mobile stations 102–104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102–104 communicate with base stations 101 and 160 via corresponding reverse links. Each reverse link is maintained by a reverse link signal, such as reverse link signals 107–109 for respectively mobile stations 102–104.

In a soft handoff situation, base stations 101 and 160 may be communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160.

For transmitting a data packet to mobile station 102 in soft handoff, base stations 101 and 160 may transmit identical information synchronously to the mobile station 102. On the reverse link, both base stations 101 and 160 may attempt to decode the traffic data transmission from the mobile station 102.

Figure 2:
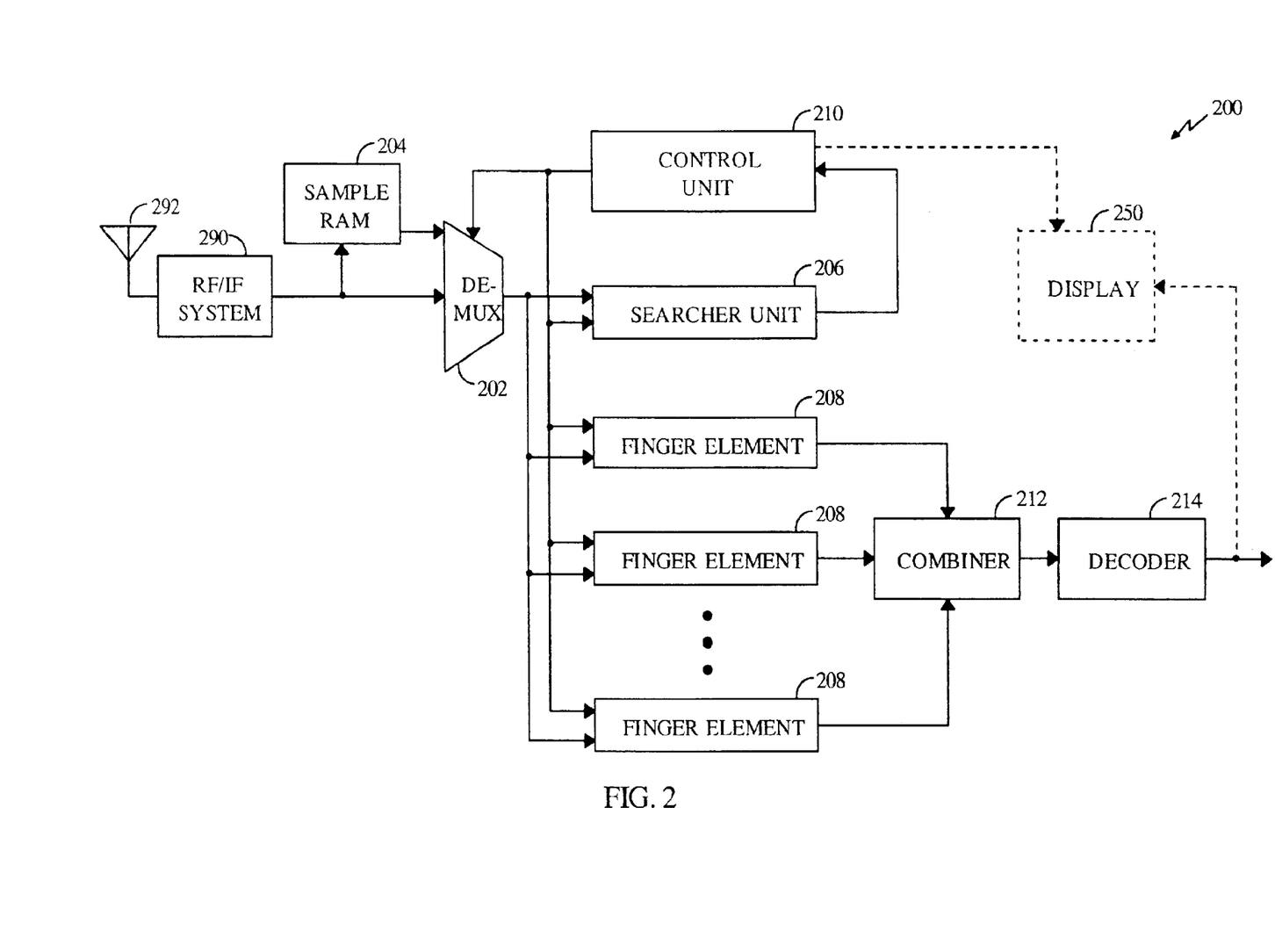
FIG. 2 illustrates a communication system receiver for operation in accordance with various embodiments of the invention.

FIG. 2 illustrates a block diagram of a receiver 200 used for processing and demodulating the received CDMA signal. Receiver 200 may be used for decoding the information on reverse and forward links signals. Received (Rx) samples may be stored in RAM 204. Received samples are generated by a radio frequency/intermediate frequency (RF/IF) system 290 and an antenna system 292. Antenna system 292 receives an RF signal, and passes the RF signal to RF/IF system 290. RF/IF system 290 may be any conventional RF/IF receiver. The received RF signals are filtered, downconverted and digitized to form RX samples at base band frequencies. The samples are supplied to a demultiplexer (demux) 202. The output of demux 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with soft-output Viterbi algorithm or a turbo decoder.

During operation, receive samples are supplied to demux 202. Demux 202 supplies the samples to searcher unit 206 and finger elements 208. Control unit 210 configures finger elements 208 to perform demodulation of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art.

Receiver 200 may be used in a receiver portion of base stations 101 and 160 for processing the reverse link signals and in a receiver portion of mobile stations 102–104 for processing the forward link signals. Receiver 200 may also include a display 250. Display 250 in receiver 200 may be optional in case the receiver is used in a base station. Display 250 receives decoded data from decoder 214, directly or indirectly, to display an image. Control unit 210 may control various aspects of receiver 200 for controlling the images that are displayed on display 250. For performing an animation on display 250, control unit 210 may control various aspects of the animation process. In accordance with various aspects of the invention, control unit 210 may process the decoded information relating to the animation process, and provide the processed information to the display.

Figure 3:
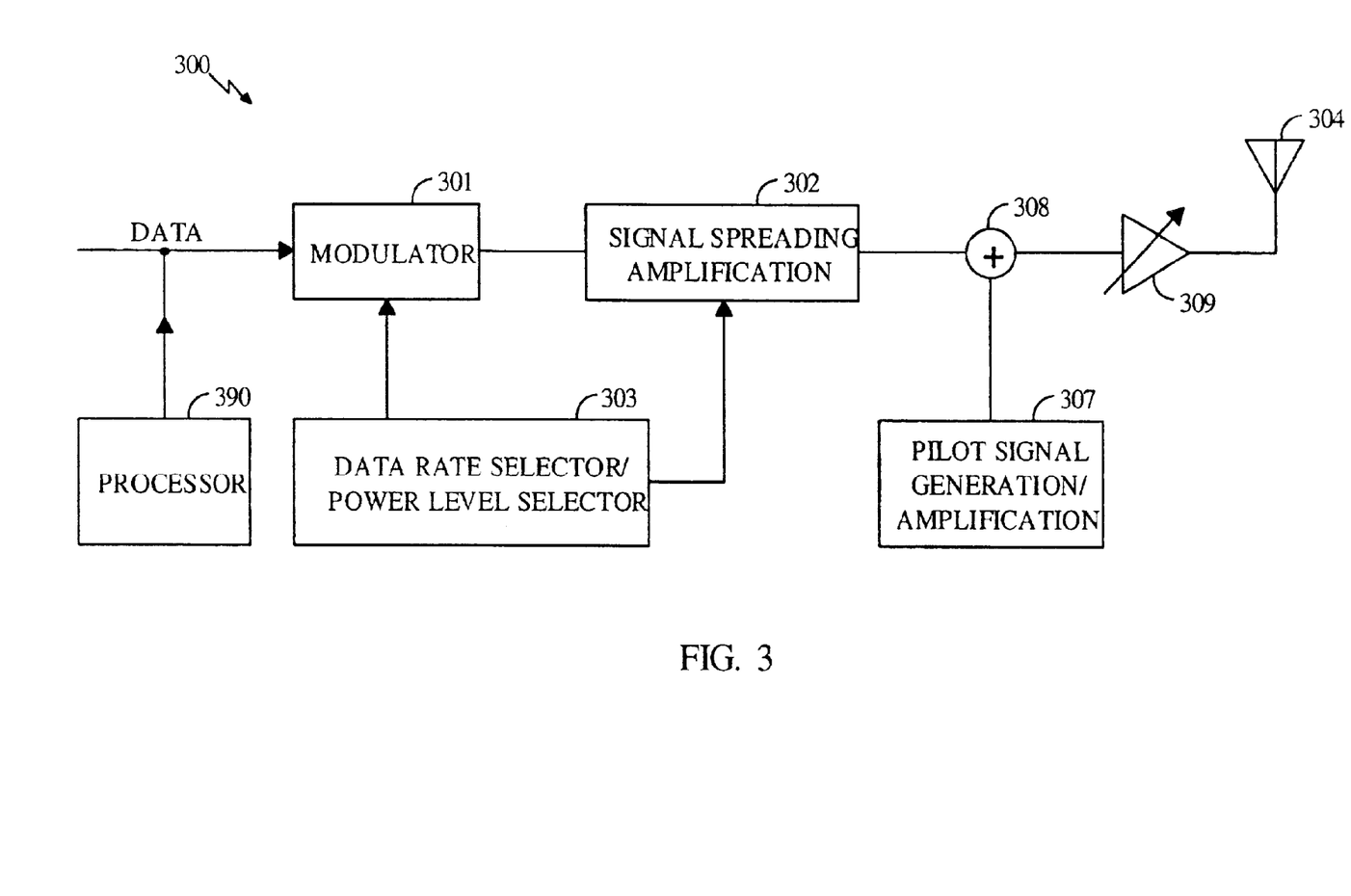
FIG. 3 illustrates a communication system transmitter for operation in accordance with various embodiments of the invention.

FIG. 3 illustrates a block diagram of a transmitter 300 for transmitting the reverse or forward link signals. A traffic channel data for transmission are input to a modulator 301 for modulation. The traffic channel data, on a forward link, may include processed animation data. The animation data may be processed in accordance with various aspects of the invention. The animation data are transmitted to a receiving destination for further processing in accordance with various aspects of the invention for an animation process on a display associated with the receiver. A processor 390 may produce the animation data in accordance with various embodiments of the invention for transmission to a destination receiver such as receiver 200. The destination receiver processes the animation data and displays the animation on a display, such as display 250, in accordance with various embodiments of the invention.

The data modulation at modulator 301 may be according to any of the commonly known modulation techniques such as QAM, PSK or BPSK. The data is encoded at a data rate in modulator 301. The data rate may be selected by a data rate and power level selector 303. The data rate selection may be based on feedback information. The information may include a data rate request and report of a channel condition at the receiving destination. The data rate and power level selector 303 accordingly selects the data rate in modulator 301. The output of modulator 301 passes through a signal spreading operation and amplified in a block 302 for transmission from an antenna 304. A pilot signal is also generated in a block 307. The pilot signal is amplified to an appropriate level in block 307. The pilot signal power level may be in accordance with the channel condition at a receiving destination. The pilot signal may be combined with the traffic channel signal in a combiner 308. The combined signal may be amplified in an amplifier 309 and transmitted from antenna 304. The data rate and power level selector 303 also selects a power level for the amplification level of the transmitted signal in accordance with the feedback information. The combination of the selected data rate and the power level allows proper decoding of the transmitted data at the receiving base station.

Figure 4:
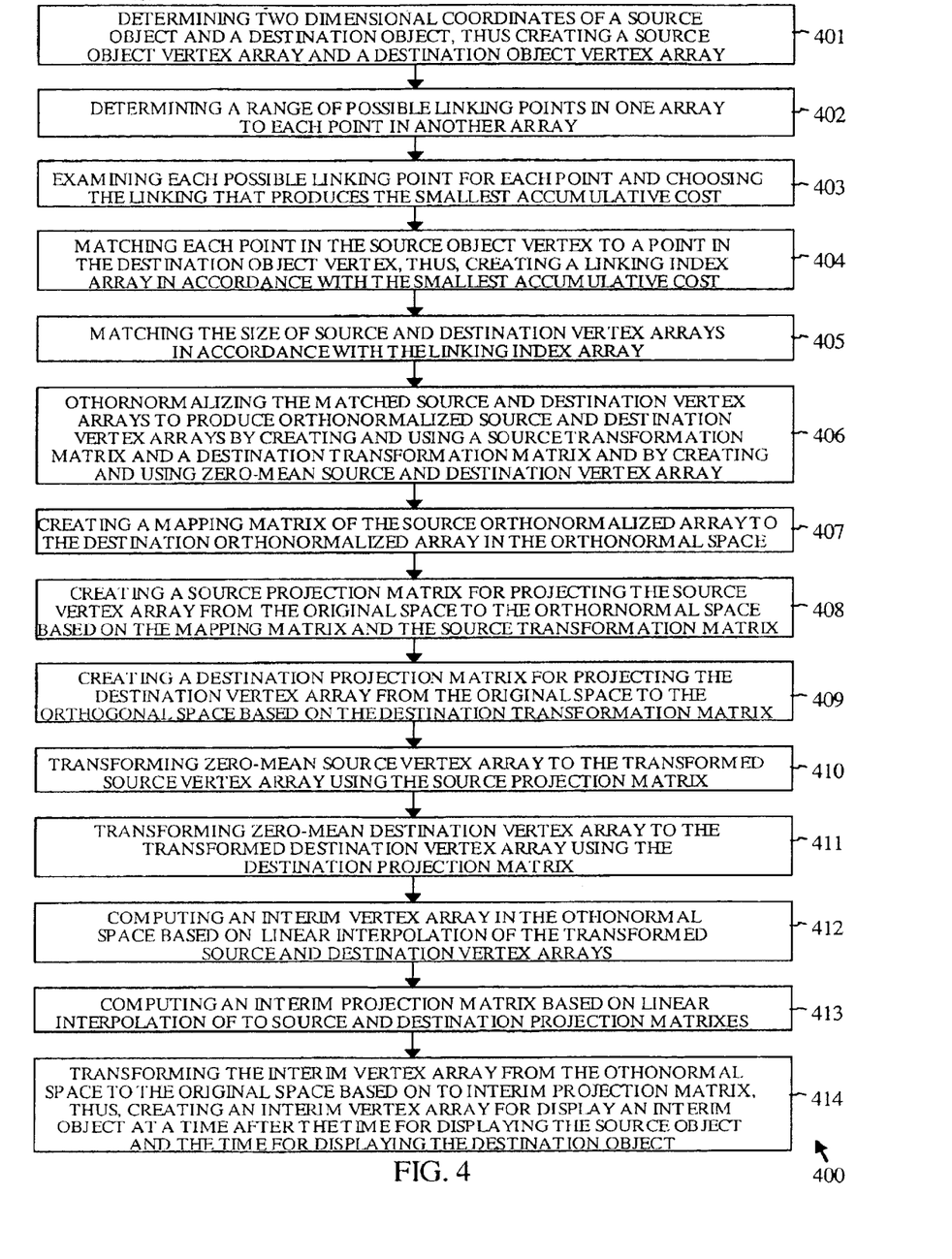
FIG. 4 illustrates a flow chart of a process incorporating various steps for animation of an object in accordance with various embodiments of the invention.
Figure 5:
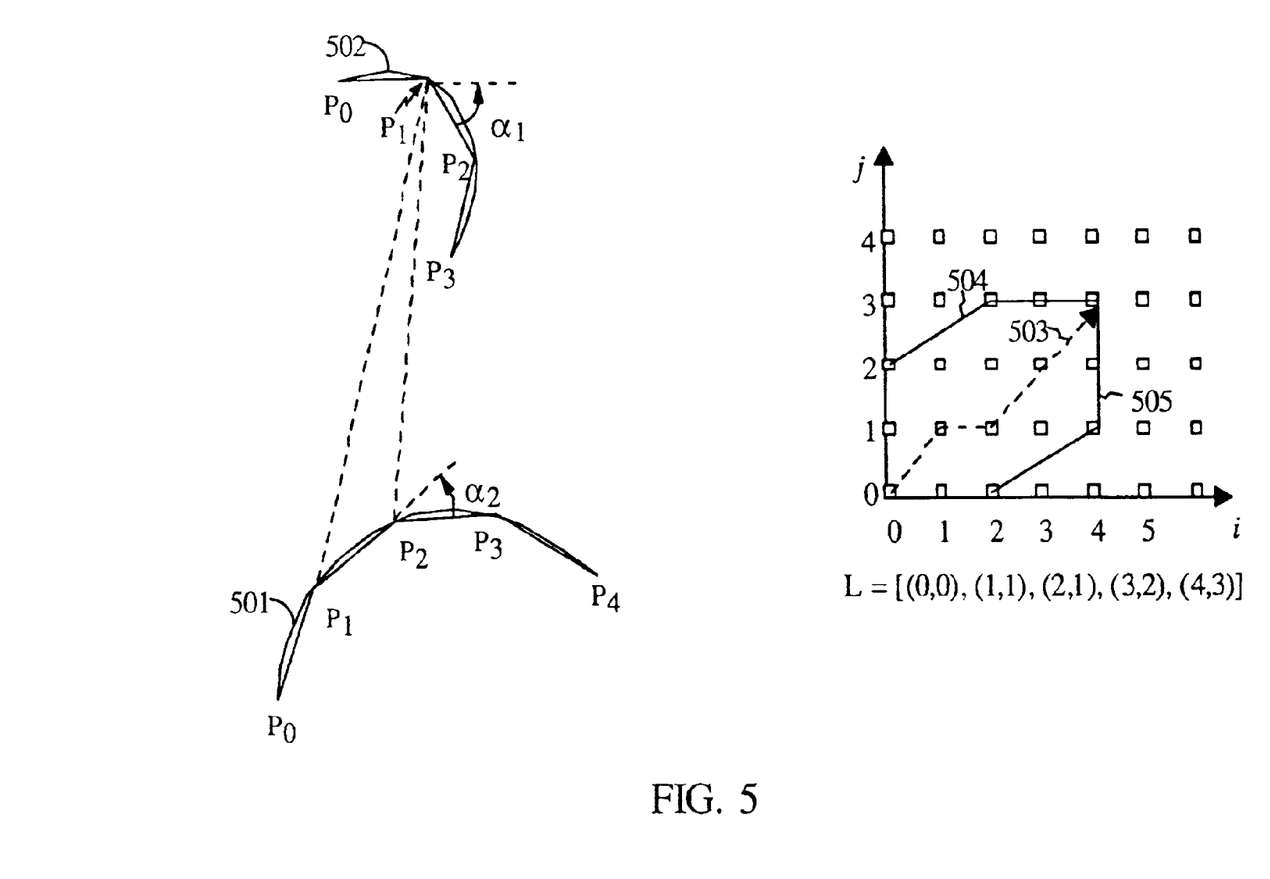
FIG. 5 illustrates an exemplary source and destination object and a linking index of the source and destination objects control points in accordance with an embodiment of the invention.

Referring to FIG. 4, generally stated, a flow chart 400 provides various steps necessary to process animation data at a processor of a transmitter and a receiver for displaying animation of a character made from one or more objects in accordance with various aspects of the invention. A processor such as processor 390 may perform the steps necessary at the transmitter 300, and a control system 210 incorporating a function of a processor may perform the steps necessary at the receiver 200. At step 401, the two-dimensional coordinates of a set of control points in a source object and a destination object are determined. A character in the animation may be formed with many different objects. Therefore, the two-dimensional coordinates of a set of control points in the source objects and the destination objects are determined. Referring to FIG. 5, an example of a source object 501 and a destination object 502 are shown. The source object 501 may have five control points (m=5) and the destination object 502 may have four control points (n=4). The source and destination objects 501 and 502 are shown like two curves, however, the objects may take any shape and forms. The coordinates of the control points in the source and destination objects may be shown by respectively a source object vertex array and a destination object vertex array as following:

$$P_{mx2}^{s}=P^{s}=[P_0, P_1, \ldots P_m]^T=[(X_0,Y_0), (X_1,Y_1), \ldots, (X_m, Y_m)]^T$$

$$P_{nx2}^{d}=P^{d}=[P_0, P_1, \ldots P_n]^T=[(X_0,Y_0), (X_1,Y_1), \ldots, (X_n,Y_n)]^T.$$

At step 402, a range of possible linking points in one array to each point in another is determined. For example, the control points in source object 501 are linked to the control points in the destination object 502. The number of points in source and destination objects may or may not be equal. One point in one object may be linked to two or more points in another object. The graph 503 shows the linking of the points, in one example, in the source and destination objects 501 and 502. The end points of the objects in accordance with an embodiment are linked to each other. For example, the first points (P0) in the source and destination objects 501 and 502 are linked to each other. The final points in the objects in accordance with an embodiment are linked to each other. For example, the final point (P4) of the source object is linked to the final point (P3) of the destination object. The points P1 and P2 of the source objects are linked to point P1 of the destination object in an example. A linking index array may be determined as following:

$$L_K=(i,j), K=0,1,\ldots,m-1, i\in[0,m), j\in[0,n).$$

The range of possible linking points may be shown by the lines 504 and 505 for the upper and lower boundaries. For example, the point P1 in the source array may be linked to points P0, P1 and P2 of the destination array as shown by the upper and lower boundary lines 504 and 505. The boundaries are shown since a point in one array may not have unlimited linking possibilities. There is a range of possible linking points that provide the minimal geometrical distortion. At step 403, each possible point is examined in a process. For example for point P1 in the source array 501, the process may include determining the minimum (smallest) accumulative cost of all the possible linking points for P1. The point in the destination array that produces the minimum cost is selected. The process then moves to the next point P2 in the source array 501. All the possible linking points are examined. The selected linking point produces the smallest accumulative cost in combination with the accumulative cost determined for the P1. The linking array is then determined at step 404 by matching each point in the source object vertex array to a point in the destination object vertex array in accordance with the smallest accumulative cost. The linking cost may indicate a type of geometrical distortion level created based on the determined linking index. The accumulative cost may be measured in terms of the angular change of the line segments connecting the control points in each object. For example, the angle $\alpha_K$ may be between the line segments $(P_{k+1}, P_k)$, $(P_k, P_{K-1})$. In accordance with an embodiment, the accumulative cost may be determined in accordance with the following relationship:

$$ACC_K = ACC_{K-1} + |\alpha_i^s - \alpha_j^d|.$$

The process 400 moves to a step 405 to match the size of the source and destination vertex arrays in accordance with the accepted linking index array. The source and destination vertex arrays are modified to include more points for matching the size of the arrays. For example, the point P1 in the destination vertex array is repeated twice corresponding to the points P1 and P2 in the source vertex array.

At step 406, the matched source and destination vertex arrays are ortho-normalized to produce ortho-normalized source and destination vertex arrays. To determine, the ortho-normalized source and destination vertex arrays, the source and destination vertex arrays are modified to create a zero-mean source vertex array and a zero-mean destination vertex array, $P_o^s$, $P_o^d$. To create a zero mean source vertex array, the mean of X dimension and the mean of Y dimension ($m_x^s$, $m_y^s$) of the source object are determined. The mean of each dimension is subtracted from the same dimension elements of the array to create the zero-mean source vertex array. To create a zero mean destination vertex array, the mean of X dimension and the mean of Y dimension ($m_x^d$, $m_y^d$) of the destination object are determined. The mean of each dimension is subtracted from the same dimension elements of the array to create the zero-mean destination vertex array. A source and destination transformation matrixes are also determined. The source and destination transformation matrixes may be written according to the following:

$$M_n^s = \begin{bmatrix} s_x & o \\ o & s_y \end{bmatrix} \begin{bmatrix} a & a \\ -a & a \end{bmatrix} \begin{bmatrix} u_1 & 0 \\ 0 & u_2 \end{bmatrix}$$

$$M_N^d = \begin{bmatrix} d_x & o \\ o & d_y \end{bmatrix} \begin{bmatrix} a & a \\ -a & a \end{bmatrix} \begin{bmatrix} v_1 & 0 \\ 0 & v_2 \end{bmatrix}.$$

The $s_x, s_y$ and $d_x, d_y$ are the scaling factor of x, y dimensions of the source and destination vertex arrays, respectively. The $u_1, u_2, v_1, v_2$ are scaling factors that will be explained in the next set of formulas. The value for parameter "a" is equal to an inverse of square root of two. The source transformation matrix and the destination transformation matrix are multiplied to, respectively, the zero-mean source and destination vertex arrays to determine the ortho-normalized source and destination vertex arrays according to the following:

$$P_N^s = P_O^S \begin{bmatrix} s_x & o \\ o & s_y \end{bmatrix} \begin{bmatrix} a & a \\ -a & a \end{bmatrix} \begin{bmatrix} u_1 & 0 \\ 0 & u_2 \end{bmatrix}$$

$$P_N^d = P_o^d \begin{bmatrix} d_x & o \\ o & d_y \end{bmatrix} \begin{bmatrix} a & a \\ -a & a \end{bmatrix} \begin{bmatrix} v_1 & 0 \\ 0 & v_2 \end{bmatrix}.$$

The $u_1, u_2, v_1, v_2$ are determined such that the transformed arrays are ortho-normal ($P_N^{s^T} P_N^s = I_{2 \times 2}$ and $P_N^{d^T} P_N^d = I_{2 \times 2}$ where $I_{2 \times 2}$ is a 2D identity matrix). At step 407, a mapping matrix of the source ortho-normalized array to the destination ortho-normalized array are determined by multiplying the transposed form of the ortho-normalized source vertex array to the ortho-normalized destination vertex array according to the following:

$$M_n^m = P_N^{s^T} P_N^d.$$

At step 408, a source projection matrix is created for projecting the source vertex array from the original space to the ortho-normal space based on the mapping matrix and the source transformation matrix. The source projection matrix may be according to the following:

$$M^s = M_N^s M_n^m.$$

At step 409, a destination projection matrix is created for projecting the destination vertex array from the original space to the ortho-normal space. The destination projection matrix may be equal to the destination transformation matrix, and may be according to the following:

$$M^d = M_n^d.$$

The steps from 401–409 may be performed by processor 390 in transmitter 300. The transmitter 300 may transmit the zero-mean source and destination vertex arrays $P_o^s$, $P_o^d$ and source and destination projection matrixes to the receiver for displaying an animation of a character involving the source and destination objects, in accordance with various embodiments of the invention.

At step 410, the zero-mean source vertex array is transformed to a transformed source vertex array using the source projection matrix according to the following:

$$P_P^s = P_o^s M^s.$$

At step 411, the zero-mean destination vertex array is transformed to a transformed destination vertex array using the destination projection matrix according to the following:

$$P_p^d = P_o^d M^d.$$

At step 412, an interim vertex array in the ortho-normal space is determined based on a linear interpolation of the transformed source and destination vertex arrays according to the following:

$$P_N^i = (1-t) P_P^s + t P_p^d,$$

where "t" represents a unit of time.

At step 413, an interim projection matrix is determined based on a linear interpolation of the source and destination projection matrixes. The interim projection matrix may be according to the following:

$$M_i = (1-t) M^s + t M^d,$$

where "t" represents a unit of time.

At step 414, an interim object vertex array for display at a time between the time for displaying the source and destination objects may be determined based on the interim vertex array and the interim projection matrix according to the following:

$$P_o^i = P_N^i M_i^{-1}.$$

The interim object vertex array may be displayed by display 250 with minimal distortion for an animation of the object beginning from the source object to the destination object with the interim object displayed in between.

The character may be formed with many different objects. The animation may begin with a source character in a source image, and may end with a destination character in a destination image. Therefore, at an initial step, the objects in the source character are paired to objects in the destination character. The paired objects, thus, are the source object and destination objects. Each paired source and destination objects may be processed in accordance with the process flow 400. Therefore, several interim objects may need to be determined to complete an interim character for animation of a character from a source character to a destination character.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for animation of an object comprising:
   determining a source projection matrix for projecting a source vertex array of a source object from an original space to an ortho-normal space;
   determining a destination projection matrix for projecting a destination vertex array of a destination object from an original space to an ortho-normal space;
   determining a zero-mean source vertex array of said source vertex array;
   determining a zero-mean destination vertex array of said destination vertex array;
   transforming said zero-mean source vertex array to a transformed source vertex array using said source projection matrix;
   transforming said zero-mean destination vertex array to a transformed destination vertex array using said destination projection matrix;
   computing an interim vertex array in said ortho-normal space based on a linear interpolation of said transformed source vertex array and said transformed destination vertex array;
   computing an interim projection matrix based on a linear interpolation of said source projection matrix and said destination projection matrix; and
   transforming said interim vertex array from said ortho-normal space to said original space based on said interim projection matrix.

2. The method as recited in claim 1 further comprising:
   displaying an interim object based on said interim vertex array in said original space at a time between display times of said source object based on said source vertex array and said destination object based on said destination vertex array, thereby, producing said animation of said object.

3. The method as recited in claim 1 further comprising:
   determining a two-dimensional coordinates of said source object, thereby producing said source vertex array in said original space; and
   determining a two-dimensional coordinates of said destination object, thereby producing said destination vertex array in said original space.

4. The method as recited in claim 1 further comprising:
   matching each point in said source vertex array to a point in said destination array, thus creating a link index array; and
   matching sizes of said source and destination vertex array in accordance with said linking index array.

5. The method as recited in claim 4 further comprising:
   determining a range of possible linking points;
   examining said range of possible linking points for determining a smallest accumulative cost; and
   wherein said created link index array corresponds to said smallest accumulative cost.

6. The method as recited in claim 4 further comprising:
   ortho-normalizing said source vertex array resulted from said matching sizes of said source and destination vertex array to produce ortho-normalized source vertex array; and
   ortho-normalizing said destination vertex array resulted from said matching sizes of said source and destination vertex array to produce ortho-normalized destination vertex array.

7. The method as recited in claim 6 further comprising:
   creating a mapping matrix of said ortho-normalized source vertex array to said ortho-normalized destination vertex array in said ortho-normalized space.

8. The method as recited in claim 7 wherein said ortho-normalizing said source vertex array comprises:
   determining a zero-mean source vertex array;
   determining a source transformation matrix; and
   using said a zero-mean source vertex array and said source transformation matrix to produce said ortho-normalized source vertex array.

9. The method as recited in claim 8 wherein said determining said source projection matrix is based on said mapping matrix and said source transformation matrix.

10. The method as recited in claim 7 wherein said ortho-normalizing said destination vertex array comprises:
    determining a zero-mean destination vertex array;
    determining a destination transformation matrix; and
    using said a zero-mean destination vertex array and said destination transformation matrix producing said ortho-normalized destination vertex array.

11. The method as recited in claim 10 wherein said determining said destination projection matrix is based on said destination transformation matrix.

12. An apparatus for animation of an object comprising:
    means for determining a source projection matrix for projecting a source vertex array of a source object from an original space to an ortho-normal space;
    means for determining a destination projection matrix for projecting a destination vertex array of a destination object from an original space to an ortho-normal space;
    means for determining a zero-mean source vertex array of said source vertex array;
    means for determining a zero-mean destination vertex array of said destination vertex array;
    means for transforming said zero-mean source vertex array to a transformed source vertex array using said source projection matrix;
    means for transforming said zero-mean destination vertex array to a transformed destination vertex array using said destination projection matrix;
    means for computing an interim vertex array in said ortho-normal space based on a linear interpolation of said transformed source vertex array and said transformed destination vertex array;

means for computing an interim projection matrix based on a linear interpolation of said source projection matrix and said destination projection matrix; and means for transforming said interim vertex array from said ortho-normal space to said original space based on said interim projection matrix.

13. The apparatus as recited in claim 12 further comprising:

means for displaying an interim object based on said interim vertex array in said original space at a time between display times of said source object based on said source vertex array and said destination object based on said destination vertex array, thereby, producing said animation of said object.

14. In a communication system, a method for animation of an object comprising:

transmitting from a transmitter to a receiver a source projection matrix for projecting a source vertex array of a source object from an original space to an ortho-normal space;

transmitting from said transmitter to said receiver a destination projection matrix for projecting a destination vertex array of a destination object from an original space to an ortho-normal space;

determining a zero-mean source vertex array of said source vertex array;

determining a zero-mean destination vertex array of said destination vertex array;

transforming, in said receiver, said zero-mean source vertex array to a transformed source vertex array using said source projection matrix;

transforming, in said receiver, said zero-mean destination vertex array to a transformed destination vertex array using said destination projection matrix;

computing, in said receiver, an interim vertex array in said ortho-normal space based on a linear interpolation of said transformed source vertex array and said transformed destination vertex array;

computing, in said receiver, an interim projection matrix based on a linear interpolation of said source projection matrix and said destination projection matrix; and transforming, in said receiver, said interim vertex array from said ortho-normal space to said original space based on said interim projection matrix.

15. The method as recited in claim 14 further comprising:

displaying, on a display in communication with said receiver, an interim object based on said interim vertex array in said original space at a time between display times of said source object based on said source vertex array and said destination object based on said destination vertex array, thereby, producing said animation of said object.

16. In a communication system, an apparatus for animation of an object comprising:

a transmitter for transmitting to a receiver a source projection matrix for projecting a source vertex array of a source object from an original space to an ortho-normal space, and transmitting a destination projection matrix for projecting a destination vertex array of a destination object from an original space to an ortho-normal space; and a controller in communication with said receiver for transforming a zero-mean source vertex array of said source vertex array to a transformed source vertex array using said source projection matrix, transforming a zero-mean destination vertex array of said destination vertex array to a transformed destination vertex array using said destination projection matrix, computing an interim vertex array in said ortho-normal space based on a linear interpolation of said transformed source vertex array and said transformed destination vertex array, computing an interim projection matrix based on a linear interpolation of said source projection matrix and said destination projection matrix, transforming said interim vertex array from said ortho-normal space to said original space based on said interim projection matrix.

17. The apparatus as recited in claim 16 further comprising:

a display, in communication with said receiver, for displaying an interim object based on said interim vertex array in said original space at a time between display times of said source object based on said source vertex array and said destination object based on said destination vertex array, thereby, producing said animation of said object.

18. A processor for animation of an object comprising:

means for determining a source projection matrix for projecting a source vertex array of a source object from an original space to an ortho-normal space, and a destination projection matrix for projecting a destination vertex array of a destination object from an original space to an ortho-normal space;

means for transforming a zero-mean source vertex array of said source vertex array to a transformed source vertex array using said source projection matrix, and for transforming a zero-mean destination vertex array of said destination vertex array to a transformed destination vertex array using said destination projection matrix; and means for computing an interim vertex array in said ortho-normal space based on a linear interpolation of said transformed source vertex array and said transformed destination vertex array, computing an interim projection matrix based on a linear interpolation of said source projection matrix and said destination projection matrix, and transforming said interim vertex array from said ortho-normal space to said original space based on said interim projection matrix.

19. The processor as recited in claim 18 further comprising:

means for coupling to a display for displaying an interim object based on said interim vertex array in said original space at a time between display times of said source object based on said source vertex array and said destination object based on said destination vertex array, thereby, producing said animation of said object.

20. In a communication system, a method for animation of an object in a receiver, comprising:

determining and transmitting to said receiver a source projection matrix for projecting a source vertex array of a source object from an original space to an ortho-normal space and a destination projection matrix for projecting a destination vertex array of a destination object from an original space to an ortho-normal space, wherein said source vertex array and said destination vertex array are modified to create a zero-mean source vertex array and a zero mean destination vertex array.

21. The method as recited in claim 20 further comprising:

receiving and transforming said zero-mean source vertex array of said sour e vertex array to a transformed source vertex array using said source projection matrix and transforming said zero-mean destination vertex array of said destination vertex array to a transformed destination vertex array using said destination projection matrix; and computing an interim vertex array in said ortho-normal space based on a linear interpolation of said transformed source vertex array and said transformed destination vertex array, computing an interim projection matrix based on a linear interpolation of said source projection matrix and said destination projection matrix, and transforming said interim vertex array from said ortho-normal space to said original space based on said interim projection matrix.

22. The method as recited in claim 20 further comprising:

displaying on a display in communication with said receiver an interim object based on said interim vertex array in said original space at a time between display times of said source object based on said source vertex array and said destination object based on said destination vertex array, thereby, producing said animation of said object.

* * * * *